US011579157B2

United States Patent
Torres et al.

(10) Patent No.: US 11,579,157 B2
(45) Date of Patent: Feb. 14, 2023

(54) LAB INSTRUMENT STATUS MONITORING

(71) Applicant: Beckman Coulter, Inc., Brea, CA (US)

(72) Inventors: Adam Matthew Torres, Miami, FL (US); Hernando Salas, Miami, FL (US)

(73) Assignee: Beckman Coulter, Inc., Brea, CA (US)

( * ) Notice: Subject to any disclaimer, the term of this patent is extended or adjusted under 35 U.S.C. 154(b) by 773 days.

(21) Appl. No.: 16/100,360

(22) Filed: Aug. 10, 2018

(65) Prior Publication Data

US 2020/0049725 A1 Feb. 13, 2020

(51) Int. Cl.
*G01N 35/00* (2006.01)

(52) U.S. Cl.
CPC . *G01N 35/00871* (2013.01); *G01N 35/00623* (2013.01); *G01N 35/00732* (2013.01); *G01N 2035/0091* (2013.01); *G01N 2035/00752* (2013.01)

(58) Field of Classification Search
CPC ....... G01N 35/00871; G01N 2001/007; G01N 2035/00851; G01N 2035/0091; G01N 35/00584; G01N 35/00613; G01N 35/00623; G01N 35/00712; G01N 35/00732; G01N 35/00752; G06N 5/025; B01L 2200/14; B01L 2200/143; G06F 3/0481; G06Q 10/0832; G06Q 10/0833; G16H 10/40; G16H 40/20; G16H 40/67
See application file for complete search history.

(56) References Cited

U.S. PATENT DOCUMENTS

| | | | |
|---|---|---|---|
| 9,532,737 B2 | 1/2017 | Karan et al. | |
| 2012/0245447 A1* | 9/2012 | Karan | G01N 33/48792 600/365 |
| 2013/0145299 A1* | 6/2013 | Steimle | G06F 3/048 715/771 |

FOREIGN PATENT DOCUMENTS

| | | | |
|---|---|---|---|
| EP | 2 416 267 A1 | 2/2012 | |
| EP | 3 222 295 A2 | 9/2017 | |
| EP | 3222295 A2 * | 9/2017 | ............... A61L 2/14 |

OTHER PUBLICATIONS

International Search Report and Written Opinion dated Nov. 6, 2019 for Application No. PCT/US2019/045088, 11 pgs.

* cited by examiner

*Primary Examiner* — Dean Kwak
(74) *Attorney, Agent, or Firm* — Frost Brown Todd LLP

(57) ABSTRACT

A dashboard interface may be displayed on a lab instrument to provide aggregate status information from a plurality of other interfaces organized into a single interface. The aggregate status information may be viewed by a nearby user of the lab instrument, and selecting portions of the information via a touchscreen display will navigate directly to a subsequent interface that may be used to view additional information or make configuration changes relating to the selected information. The dashboard may be used as a screensaver on a lab instrument when the instrument is not in use, or may be navigated to by an active user of a lab instrument, or both.

19 Claims, 8 Drawing Sheets

LAB INSTRUMENT STATUS MONITORING

FIELD

The disclosed technology pertains to a lab instrument status interface.

BACKGROUND

Modern lab instruments such as body fluid analyzers have developed into advanced automated systems having numerous features. As these systems have become more fully featured, the interfaces used to interact with and configure such features have grown in complexity, and in some cases have not been implemented with an eye towards ease of use. In an ideal scenario, where the instrument is functioning normally, a user may be able to complete a task by waking the instrument from an inactive state, logging in, navigating to a sample testing screen, configuring a test for a sample, placing the sample in the instrument, and starting the test.

However, in scenarios where the instrument is in a state of reduced operation or is inoperable, such a task may take many additional steps. This may include, for example, receiving an error message after attempting to start the test, navigating between five separate interface screens to diagnose the source of the error as a low reagent fluid level, navigating to a materials interface to perform a reagent refill process, and then returning to your initial task, which itself may need to be re-entered or reconfigured. Such a distraction during testing can at increase the time required for completing a task, and can also increase the risk of a task being forgotten (e.g., moving on to a different task after the instrument error is addressed without completing the first task) or erroneously performed (e.g., performing the task in spite of the error, where a user may be in a hurry or is unable to locate the interface screen that identifies the error).

SUMMARY

There is a need for improved technology for presenting status interfaces to users of lab instruments in order to reduce the numbers of steps required to use an instrument. It may thus be an object of some embodiments to provide a method that could comprise steps such as displaying a dashboard interface comprising an aggregate set of status data on a display coupled to a lab instrument when the lab instrument is locked or not operated by a user, and displaying a destination interface that is associated with a user selected status data of the aggregate set of status data on the display. In some embodiments, this objective may be fulfilled by the subject matter of the independent claims, wherein further embodiments are incorporated in the dependent claims.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Figure 1:
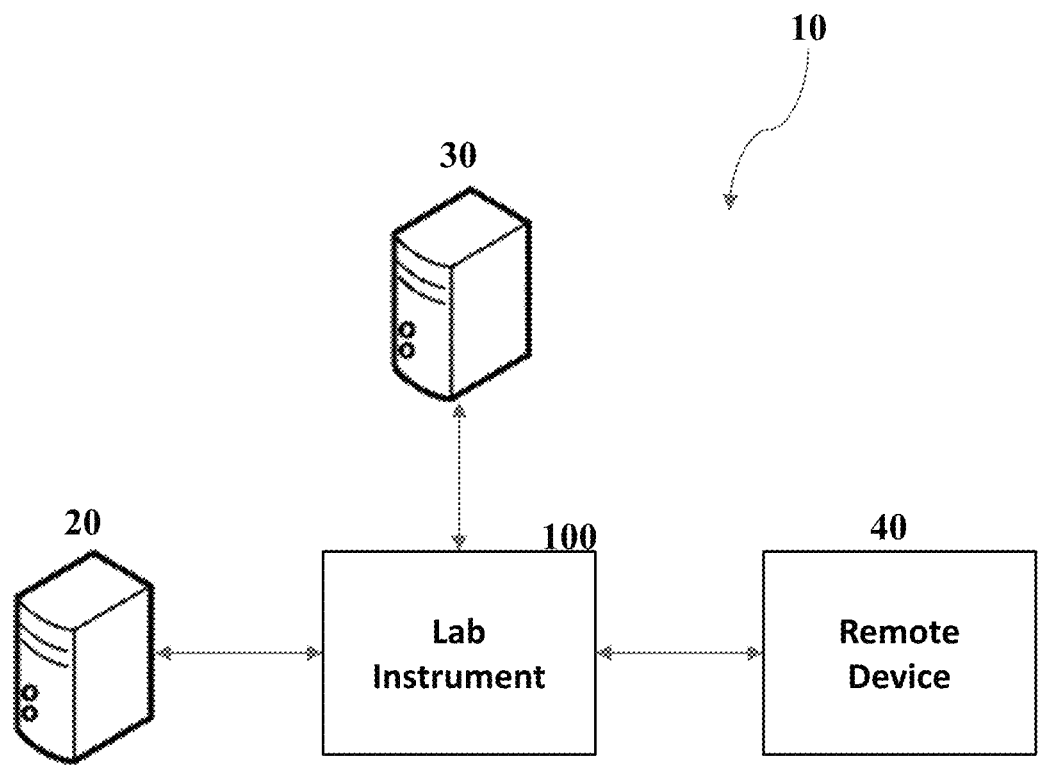
FIG. 1 is a schematic diagram of an exemplary architecture which may be used in some embodiments.

In light of the above, it could be beneficial to be able to determine and address the status of a lab instrument with a minimal amount of user effort and distraction. However, conventional approaches have required a user to perform numerous steps before returning to their intended task. According to a first aspect some embodiments may include a method comprising displaying an interface comprising an aggregate set of status data on a display coupled to a lab instrument when the lab instrument is locked or not operated by a user, and displaying a destination interface that is associated with a user selected status data of the aggregate set of status data on the display.

In some embodiments, such as described in the context of the first aspect, the destination interface is a materials interface and the aggregate set of status data comprises a set of materials data describing one or more types of material available for the lab instrument to use. In some such embodiments, the interface comprises, for each material in the set of materials, a material icon and a material quantity. In some such embodiments, the destination interface associated with each material, where the material quantity is below a resupply threshold, is configured to allow a user to resupply the material associated with that material icon.

In some embodiments, such as described in the context of the first aspect, the destination interface is a control interface and the aggregate set of status data comprises a set of control data describing one or more control tests performed on the lab instrument, the interface comprises, for each control test, a test date, a test type, and a test result, and the destination interface associated with each control test, where the test result is a failure, is configured to allow a user to re-run the test type associated with the control test.

In some embodiments, such as described in the context of the first aspect, the destination interface is a worklist interface and the aggregate set of status data comprises a set of worklist data describing one or more instrument tasks currently being performed by the lab instrument, the interface comprises, for each instrument task, a cassette description and a task stage, and the destination interface associated with each instrument task is configured to allow a user to review and modify the instrument task.

In some embodiments, such as described in the context of the first aspect, the destination interface is an event interface and the aggregate set of status data comprises a set of event data describing one or more events that have occurred on the lab instrument, the interface comprises, for each event, an event date and an event type, and the destination interface associated with each event, where the event type indicates an error, is configured to allow a user to view and correct the error.

In some embodiments, such as described in the context of the first aspect, the steps further comprise determining, based upon the aggregate set of status data, one or more status alerts, and where at least one of the status alerts comprises a service alert indicating that the lab instrument requires a service, displaying a service indicator on the interface, wherein the service indicator is configured to be removable by a technician performing the service.

In some embodiments, such as described in the context of the first aspect, the steps further comprise displaying a plurality of interfaces, individually, on the display, wherein the destination interface is one of the plurality of interfaces, and wherein the plurality of interfaces comprise status information generated by the lab instrument, identifying, as a subset of the status information, the aggregate set of status data, and locking the lab instrument when it is not in use.

In some embodiments which comprise a plurality of interfaces as described in the preceding paragraph, the steps further comprise, before displaying the destination interface, authenticating a user based upon biometric data received via a biometric authenticator of the lab instrument.

In some embodiments, such as described in the context of the first aspect, the steps further comprise whenever the interface is displayed, storing a stored interface state of the lab instrument from the moment before the interface is displayed, and returning the lab instrument to the stored interface state.

In some embodiments which comprise a stored interface state as described in the preceding paragraph, returning the lab instrument to the stored interface state occurs after determining that the destination interface should be closed, or when the interface was displayed in response to a user request while the lab instrument was operated by a user, determining that the interface should be closed.

Corresponding systems comprising one or more computers configured by computer executable instructions stored on non-transitory computer readable media to perform steps of methods described in any of the preceding embodiments, as well as non-transitory computer readable media storing instructions for performing steps of method described in any of the preceding embodiments, could also be implemented without undue experimentation by those of ordinary skill in the art based on this disclosure. Accordingly, the preceding description of potential embodiments and aspects should be understood as being illustrative only, and should not be treated as limiting.

Turning now to the figures, FIG. 1 shows a schematic diagram of an exemplary architecture 10 which may be used in some embodiments. As shown in that diagram, a lab instrument 100 may be communicatively coupled with a lab information system ("LIS") 20, a lab automation system ("LAS") 30, and a remote device 40 via a communication network such as a local area network. The lab instrument 100 may connect to the communication network using technologies such as ethernet, Wi-Fi, USB, wireless cellular, or other appropriate communication methods. The LIS 20 may be one or more physical or virtual servers configured to store data relating to the function of the lab and provide such data to other systems and devices within the lab to enable the function of the lab. The LAS 30 may be one or more physical or virtual servers configured to control the operations of a set of lab automation equipment, which may include conveyors, robotic carts, and other automated systems that may be used to automate one or more tasks within a lab environment.

The remote device 40 may be one or more user devices such as laptops, smartphones, tablets, kiosks, or other computing devices that a user may interact with in order to interact with the lab instrument 100. As an example, a remotely located technician may use the remote device 40 (e.g., a laptop) to access the lab instrument 100 and review its status or change configurations when providing service. As another example, a technician in a large lab environment may use the remote device 40 (e.g., a smartphone, tablet, or kiosk) to access a plurality of instruments like the lab instrument 100 that are available in the vicinity in order to identify a lab instrument that has the desired capabilities or availability.

Figure 2:
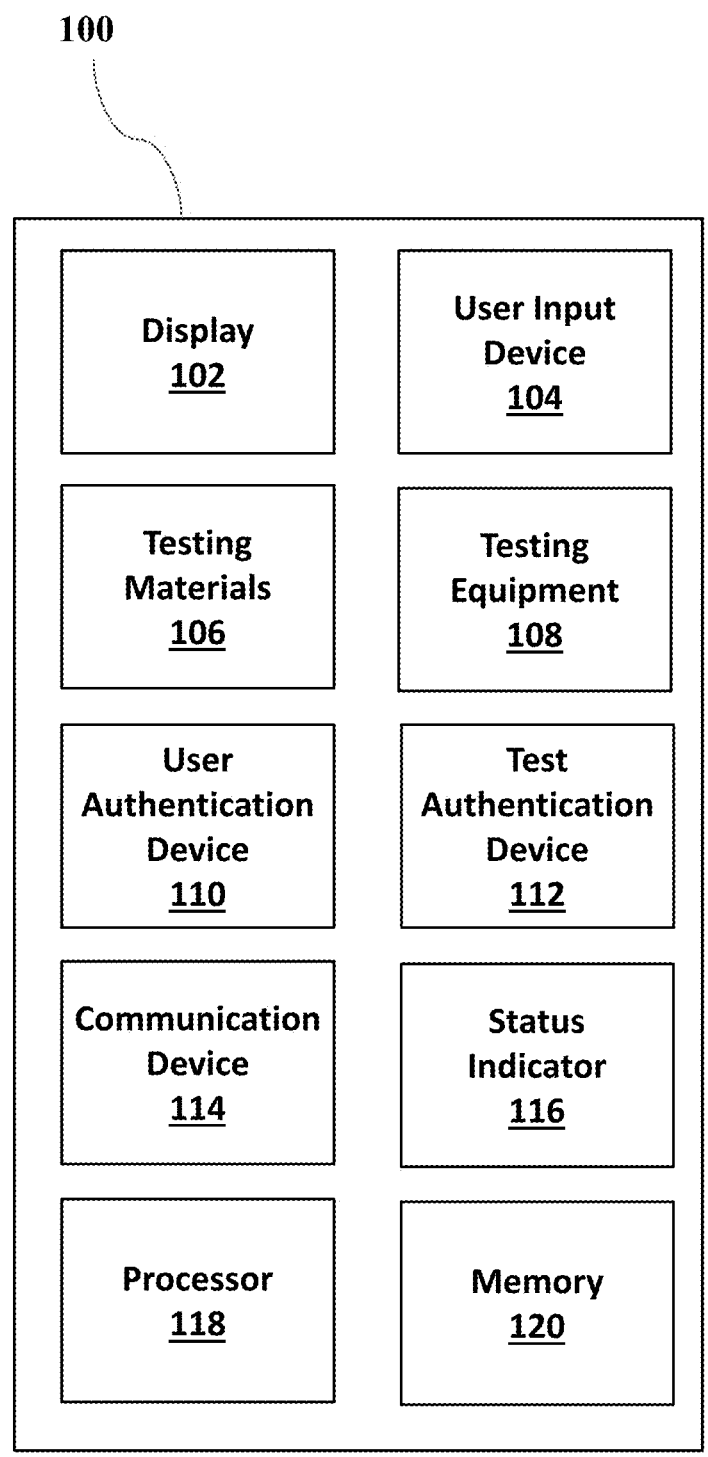
FIG. 2 is a schematic diagram of an exemplary lab instrument which may be used in some embodiments.

Turning now to FIG. 2, that figure shows a schematic diagram of an exemplary lab instrument such as the lab instrument 100 which may be used in some embodiments. The lab instrument 100 comprises a display 102 (e.g., an LCD display) configured to provide information and interfaces to users and a user input device 104 (e.g., a touchscreen) operable by users to interact with the lab instrument 100.

Figure 3:
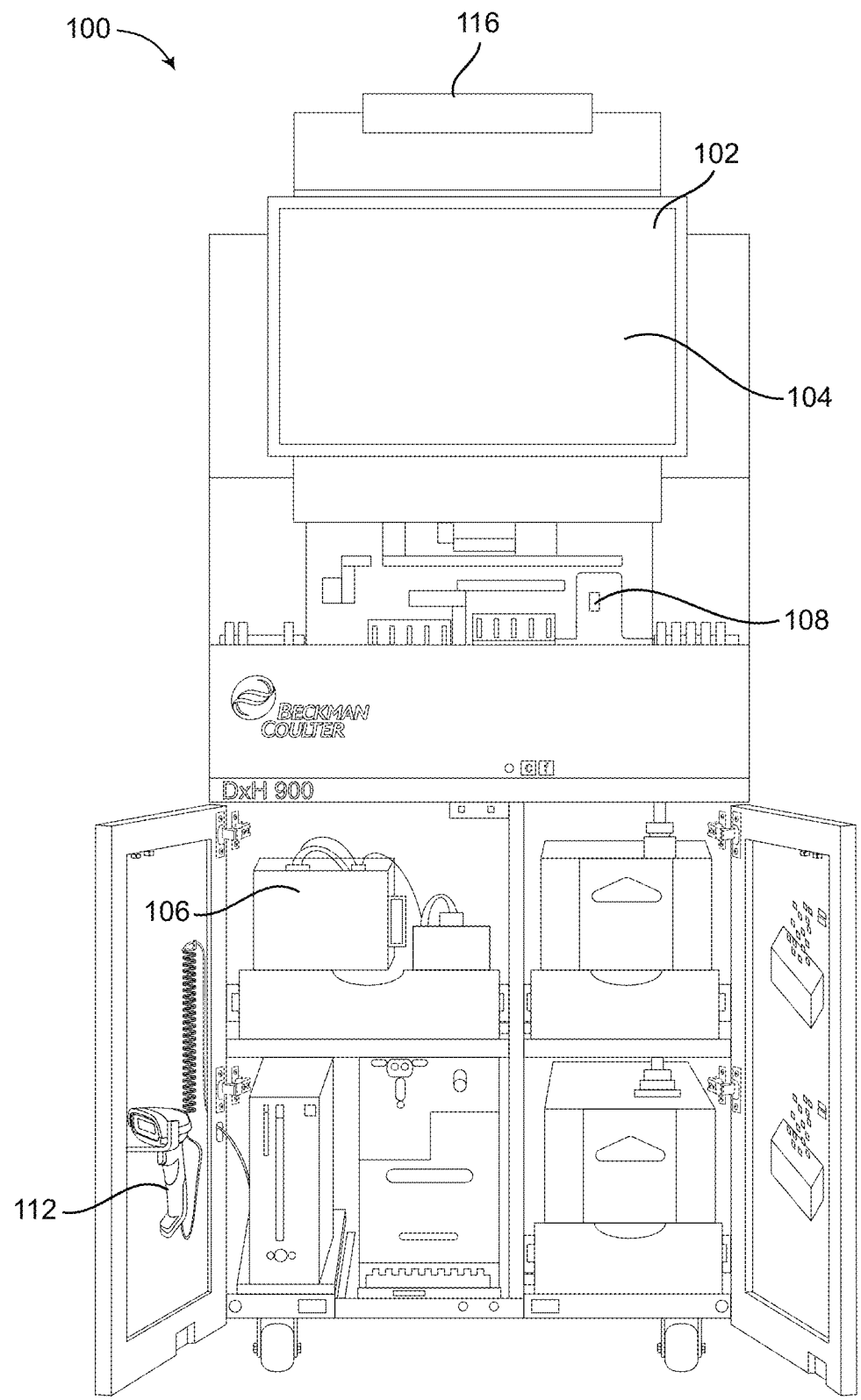
FIG. 3 is a front elevation view of the lab instrument which may be used in some embodiments.

The lab instrument 100 may also comprise a set of testing materials 106 and a set of testing equipment 108. The testing materials 106 may include materials such as reagents used in testing, cleaners used before and after testing, materials used to prepare incoming samples for testing and outgoing samples for transit, and other materials as may be required by a particular lab instrument. For example, FIG. 3 shows a front elevation view of the lab instrument 100 which may be used in some embodiments. In that figure, the lab instrument 100 comprises a storage cabinet containing a number of different testing materials 106. Current status and quantity of the testing materials 106 may be determined in various ways, such as tracking from first use (e.g., tracking quantities of a liquid material that are pumped from a reservoir having a known initial quantity), based upon mass (e.g., using a weight or mass sensor upon which each type of the testing materials 106 are placed), or based upon number of tests performed with the material (e.g., tracking a number of tests using a material, where the material has been previously determined to be sufficient for a total number of tests).

The testing equipment 108 may be operable by a user to perform one or more automated testing tasks. For example, where the testing instrument 100 is a body fluid analysis instrument, a user may place a cartridge, cassette, or other sample holder containing bodily fluids in an intake slot or other sample receiver of the testing equipment 108 and configure a test to be performed. The testing equipment 108 may then automatically access the sample within the holder, prepare it for testing (e.g., by applying or mixing the testing materials 106), perform one or more tests (e.g., projecting light through a bodily fluid to enable identification of various cells), prepare it for post-testing transit or storage (e.g., sealing or adding preservatives to the sample), and eject the sample cartridge or cassette.

The lab instrument 100 may also comprise a user authentication device 110 and a test authentication device 112, which may in varying embodiments be the same or separate devices. The user authentication device 110 may be used to allow users to access the features of the lab instrument 100 instead or in addition to user authentication via password entered via the user input device 104. The user authentication device may be, for example, a camera configured for facial scanning and recognition, a hand or finger scanner configured for biometric capture and recognition, a voice recognition unit configured to capture voice commands and identify a speaker, a RFID, Bluetooth, or other wireless transceiver configured to receive and verify identifying data from an access fob or device carried by a user, or other similar devices and systems.

The test authentication device 112 may be used to provide inventory management features and verify testing materials 106 and samples that are arriving at or leaving from the lab instrument 100. The test authentication device 112 may be a scanner or other imaging device, or a wireless receiver as described above, that is operable to receive identifying information from (e.g., by scanning a barcode or RFID chip) from a material or sample that may be used to verify that the correct material or sample is being used, or track materials or samples as they move about within a lab.

The lab instrument 100 may also comprise a communication device 114 and a status indicator 116. The communication device 114 may be an ethernet or USB device capable of wired communication, or a wireless transceiver allowing communication with the LIS 20, LAS 30, or other coupled devices via one or more wireless technologies such as Wi-Fi, Bluetooth, or wireless cellular. The status indicator 116 may be a light indicator, speaker, or other device operable to notify a user of an error, alert, status change, or other occurrence associated with the lab instrument 100. FIG. 3 shows the status indicator 116 as a light indicator that may be lit at varying levels of brightness, colors, and sequences to provide visual information to nearby users. For example, if the lab instrument 100 is currently inoperable due to insufficient levels of the testing materials 106, the status indicator 116 may intermittently flash a red light indicating its inoperability.

The lab instrument 100 also comprises a processor 118 coupled with a memory 120, that may be configured to store various instructions and configurations that are executable by the processor 118 to analyze and modify data received from users, connected devices, or generated locally to the lab instrument 100, and to control the various devices and features of the lab instrument (e.g., receiving data from the testing equipment 108 indicating an error, causing the status indicator 116 to flash red, providing a description via the display 102 and the communication device 114 of the error).

Figure 4:
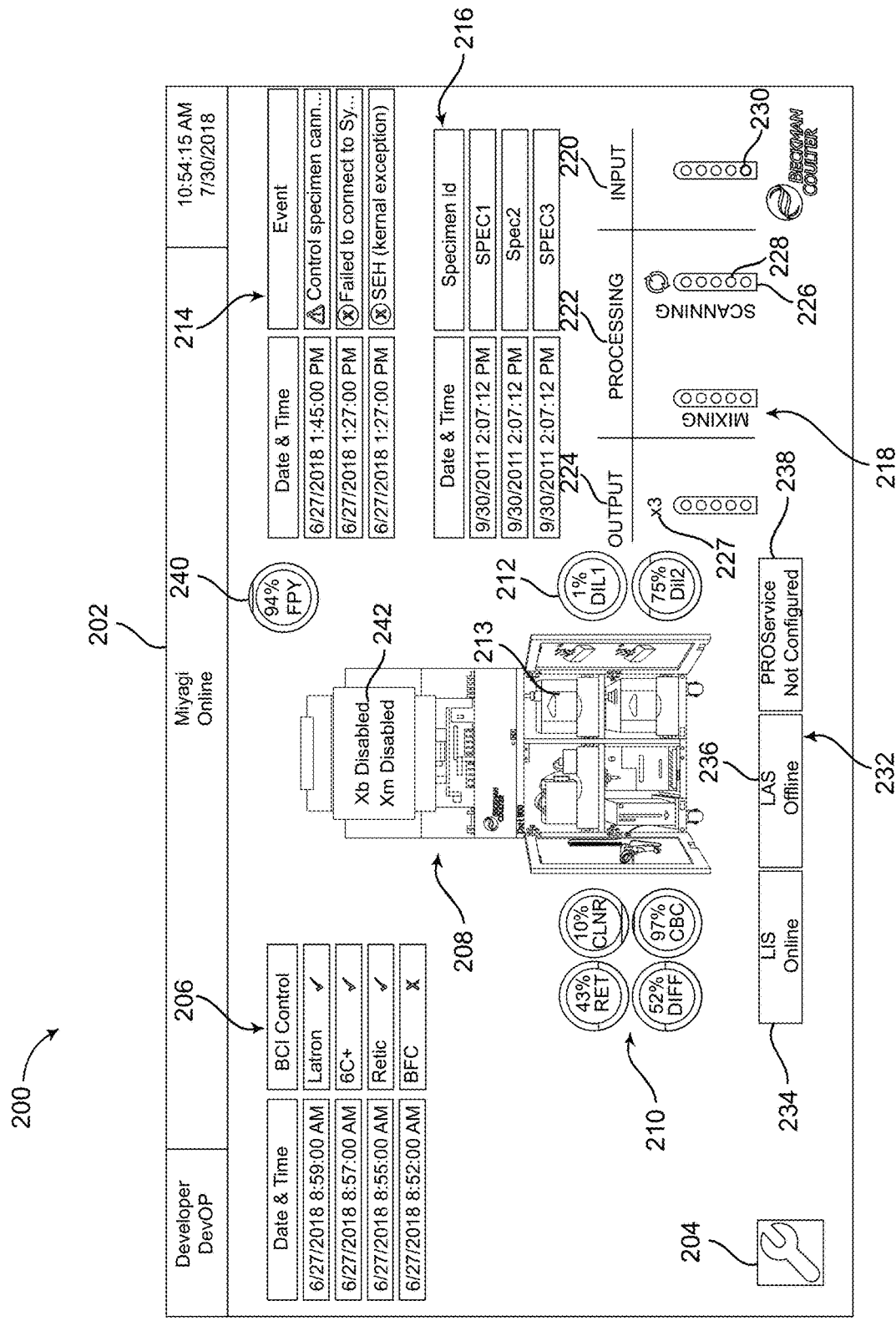
FIG. 4 is an exemplary dashboard interface which may be used in some embodiments.

Turning now to FIG. 4, that figure shows an exemplary dashboard interface 200 which may be used in some embodiments. The dashboard interface 200 may be displayed by the lab instrument 100 via the display 102, may be displayed via the remote device 40 (e.g., a lab technician may view the dashboard interface 200 for a particular lab instrument using a tablet, kiosk device, smartphone, or other remote device 40). As shown in FIG. 4, a dashboard interface 200 may comprise information and controls arranged to allow a user to efficiently determine the status of the lab instrument 100 and resolve issues related to the lab instrument 100, and may be presented to a user of the lab instrument at various stages of a user workflow with the lab instrument 100. For example, the dashboard interface 200 may be presented to users as a screensaver when the lab instrument 100 is locked or not operated by a user, or may be presented to users during various uses of the lab instrument 100. For the sake of clarity, when the lab instrument 100 is referred to as being locked or not operated by a user, this could include states such as where the lab instrument 100 is powered on but secured by a password or other authentication system, powered on but not presently operated by a user, performing automated tasks with the testing equipment 108 while locked or not operated by a user, and other similar situations where devices such as a lab instrument or computer may cause the display 102 to turn off, dim, or display a placeholder image or dynamic image as a screensaver.

A virtual status indicator 202 provides a visual indication of the status of the lab instrument 100, and may virtually mirror the physical function of the status indicator 116. The virtual status indicator 202 may also provide, in addition to light of various colors, sequences, and brightness, additional information such as a brief description of the lab instrument 100 itself that may be useful in requesting service (e.g., a device name, identifier, or location), a description of the current status and instructions, (e.g., "Status Red—Reagent Levels Low, Please Change"), a current date and time, or other information.

A service indicator 204 provides an additional visual indication of status, and may indicate whether or not the status is one that may be addressed by a user of the lab instrument 100 or whether a more advanced level of service must be requested and performed. The service indicator 204 may have various visual shapes (e.g., a wrench indicating an advanced repair is needed, a thermometer indicating overheating, a phone indicating that a maintenance service interval should be scheduled) and colors (e.g., to indicate a varying level of status, such as red being critical or yellow being a warning).

The service indicator 204 may have additional functions, for example, when a user touches the service indicator 204 on the display 102, the dashboard interface 200 may navigate the user directly to a subsequent interface that may be used to view and address the underlying service issue. For the sake of clarity, user interactions with the dashboard interface 200 will be described in the context of the display 102 being a touchscreen user input device 104, but these descriptions should not be limited to exclude the same activity being performed with a mouse click, keyboard input, or other input. The service indicator 204 may also require a user acknowledgment before normal use of the lab instrument 100 is allowed. This may include anything from a mild inconvenience (e.g., user must press the service indicator 204 for five seconds before normal use occurs) to disabling use of the lab instrument 100.

A control status 206 section may describe information relating to various control tests that have been performed on the lab instrument 100. Information provided may include a time that control was performed, the type of control that was performed (e.g., Latron, 6C+, Retic, BFC), and whether the control test passed or failed. A user interaction with the control status 206 may have different effects, for example, clicking on a passed test may navigate to a general controls interface, while clicking on a failed test may navigate to a controls interface that is specialized and pre-configured to re-run the failed test.

An instrument icon 208 provides a visual indication of the type of instrument that the dashboard interface 200 is being displayed on. A set of material icons 210 may identify a material by name, description, color, icon, or other information, and may also provide a visual indication of a quantity of the material (e.g., a percentage remaining, a number of uses remaining, a visual fill-level). The set of material icons 210 may be arranged in relation to the instrument icon 208 to provide some guidance as to their location for service or refill. For example, a dilution material icon 212 may be positioned proximately to the location 213 on the instrument icon 208 where that material would be placed in a real-world setting. A user selection of an icon via the display 102 may, in the case of a material with sufficient quantities remaining navigate to a general materials interface. In the case of a material that is below a configured threshold, such a selection may navigate to a materials interface that is specialized and pre-configured for resupplying the materials, and may include instructions for reloading the material, pre-filled input boxes describing the materials, and an interface for using the test authentication device 112 to identify and verify the resupplied material.

An event status 214 describes information relating to warnings, errors, status changes, and other events that have occurred on the lab instrument 100. Information provided may include a time of the event, an event description and an event type (e.g., a yellow flag for warning, a red X for error). As with prior interface features, a user selection of a column header of the event status 214 may navigate to a general event interface, while selection of a particular event may navigate the user to an event interface that is specialized and pre-configured for reviewing and addressing that particular event, including instructions, contact information for repair services, and other controls (e.g., providing a system or network device reset option).

A worklist status 216 may provide information relating to tasks performed or scheduled to be performed on the lab instrument 100. Information provided may include a time of the task, and a task description or identification (e.g., a sample identifier, a specimen identifier). As with prior interface features, a user selection on a header or other area may navigate to a general worklist interface, while a selection of a particular row or task may navigate to a worklist interface that is pre-configured to review or modify that particular task.

A task status 218 may provide information relating to a task that is currently being performed by the lab instrument 100. In the shown embodiment, the lab instrument is configured to perform tasks having an input stage 220, a processing stage 222, and an output stage 224. A cassette 226 with five samples 228 is shown in the processing stage 222, and a second cassette 230 with four samples and one empty sample slot 230 is currently in the input stage 220. As the lab instrument performs the tasks, the display of the cassette 226 and the second cassette 230 will transition to the appropriate stage. Other information provided with the cassette 226 by proximate association or based upon a hover-over of a cursor may include, for example, a number of cassettes at a particular stage 227, an estimated time till completion of the output stage 224, a user that started the task, a task or cassette identifier, and a sub-stage of the current stage (e.g., the processing stage 222 may have a mixing sub-stage where the cassette 226 moves up and down, an analysis sub stage where the cassette 226 spins in place). As with the worklist status 216, selecting a particular cassette may navigate to a worklist interface pre-configured with information to view and modify tasks relating to that cassette.

A network status 232 provides information relating to connectivity between the lab instrument 100 and other devices. Information provided may include a list of commonly connected devices, and a color and/or text indicator describing the connection status or availability. For example, a LIS status 234 may indicate by color, text, or both that the lab instrument 100 is connected to the LIS 20, while a LAS status 236 indicates the same for the LAS 30. A remote status 238 indicates whether or not the lab instrument 100 is configured for and connected to the remote device 40.

A first pass yield (FPY) status 240 indicates a number of historic tests or tasks performed on samples with the lab instrument 100 that were determined to be successful sample tests based on the first test. In some cases, tests need to be re-run on a sample due to an immediate error, or a later analysis of the sample or the lab instrument 100 indicating a question as to the accuracy of the results. As such, the FPY status 240 may serve as a long-term indicator of the effectiveness of the lab instrument 100 for its intended purpose.

A mode status 242 may provide information relating to one or more specialized modes that may be enabled or disabled on the lab instrument. For example, in some cases the lab instrument will be configured by a manufacturer with a set of parameters relating to the performance of control tests. Alternatively, in some cases an particular end-user may define their own control parameters either in addition to or instead of parameters defined by a manufacturer. In such a case, the mode status 242 may indicate which control parameters are enabled or disabled. As with other examples, clicking on the mode status 242 may navigate to a mode interface that is pre-configured to review or modify modes and whether they are enabled or disabled.

Figure 5:
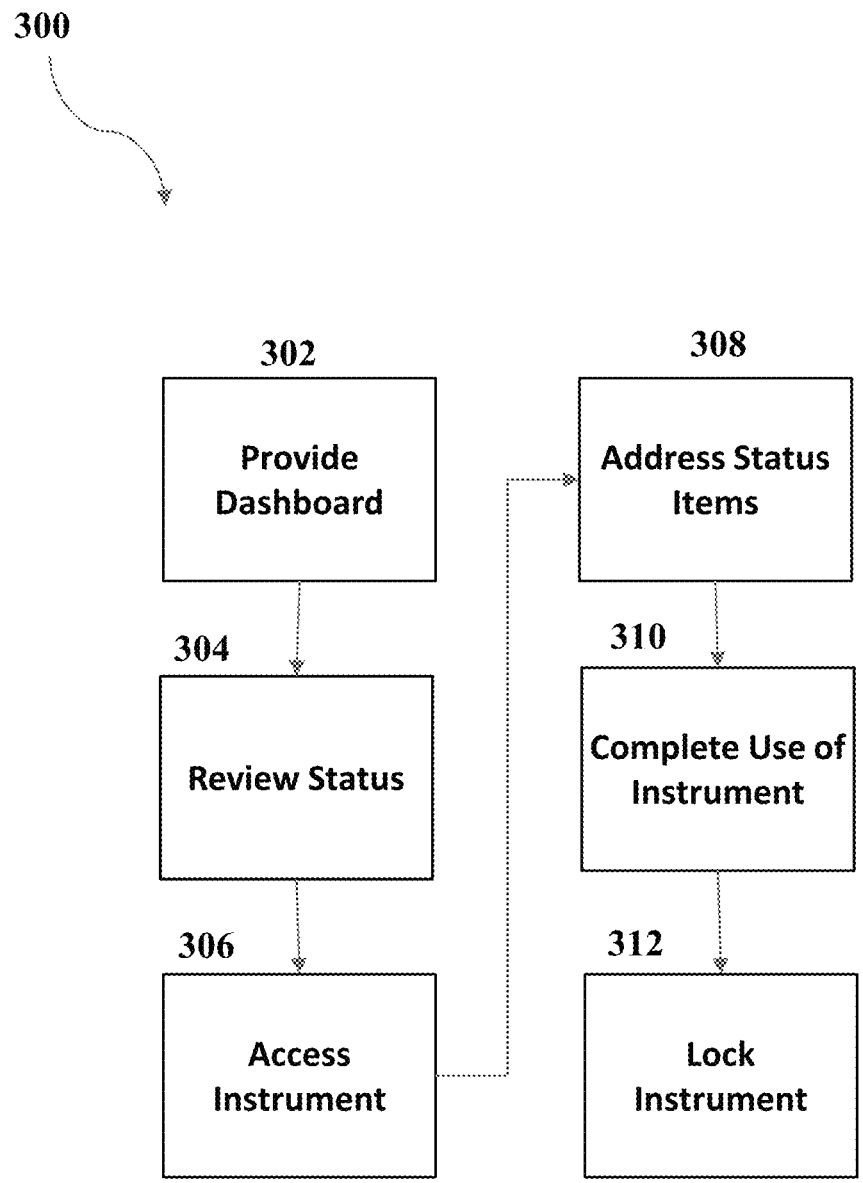
FIG. 5 is an exemplary process that may be used to utilize the lab instrument with the dashboard interface in some embodiments.

FIG. 5 is an exemplary process that may be used to utilize the lab instrument with the dashboard interface in some embodiments. The shown high level steps 300 include providing 302 the dashboard interface 200 to a user via the lab instrument 100, allowing the user to review 304 the shown status, allowing the user to access 306 the lab instrument by selecting from the dashboard interface 200 (e.g., selecting the dilution material icon 212 to navigate to a subsequent interface for refilling the material) and authenticating their access (e.g., by password or biometric recognition), allowing the user to address 308 any status issues (e.g., using the subsequent interface to refill the material), allowing the user to complete 310 their use of the instrument, and then locking 312 the instrument. In some embodiments, as will be described in more detail below, the dashboard interface 200 may be configured as a screensaver, and will display 302 whenever the lab instrument 100 is locked 312.

Figure 6:
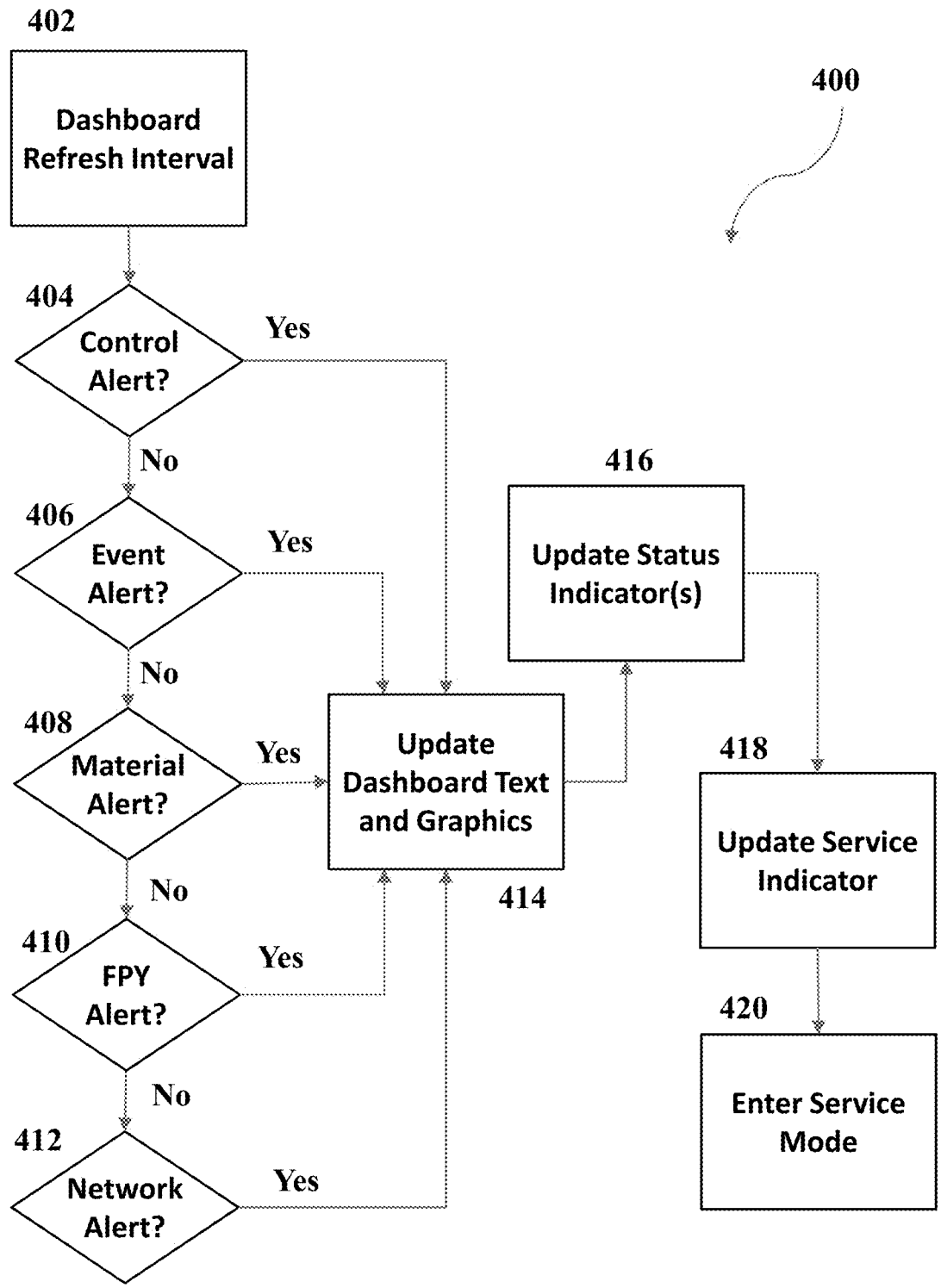
FIG. 6 is an exemplary process that may be used to update the dashboard interface and the lab instrument to reflect the status of the lab instrument in some embodiments.

FIG. 6 is an exemplary process 400 that may be used to update the dashboard interface and the lab instrument to reflect the status of the lab instrument in some embodiments. Based upon the occurrence of a dashboard refresh interval 402, the processor 118 will analyze information from features and systems of the lab instrument 100 and determine if any status changes have occurred. This may include, for example, a change in the status of a control 404 (e.g., a control was recently performed), an event recently occurred 406 (e.g., the testing equipment 108 reported a cartridge or cassette jam), a change in materials 408 (e.g., one or more materials being used for testing), an FPY alert 410 (e.g., the FPY status 240 has dropped suddenly, or fallen below a configured threshold), or a network alert 412 (e.g., the remote device 40 has connected, a connection to the LIS 20 has been lost).

When a status change is detected, the dashboard interface 200 will be updated 414 to reflect the change in status, which may include updating text (e.g., adding a new event or control entry) and changing graphics (e.g., moving cassette 226 from the processing stage 222 to the output stage 224, changing the color of LIS status 234 to red from green, reducing the fill-level of the set of material icons 210). In some cases, a change in status may also result in an update 416 to one or more status indicators, such as the status indicator 116 and the virtual status indicator 202. In some cases, a change in status may also result in an update 418 to the service indicator 204. For example, the service indicator 204 may be changed to a flashing red wrench, and may cause the dashboard interface 200 to enter 420 a service mode that prevents some uses of the lab instrument 100 until the service indicator 204 is resolved, which may require a technician. In such a case, the technician may have a code, password, tool, or other information that may be used to resolve the service indicator 204 when the issue is fixed, and remove the lab instrument 100 from service mode. In some embodiments, the service indicator 204 may only appear in situations where the lab instrument 100 is in an error state that requires service from a manufacturer technician, and will not appear where the error or alert can be addressed by a lab technician or other user.

Figure 7:
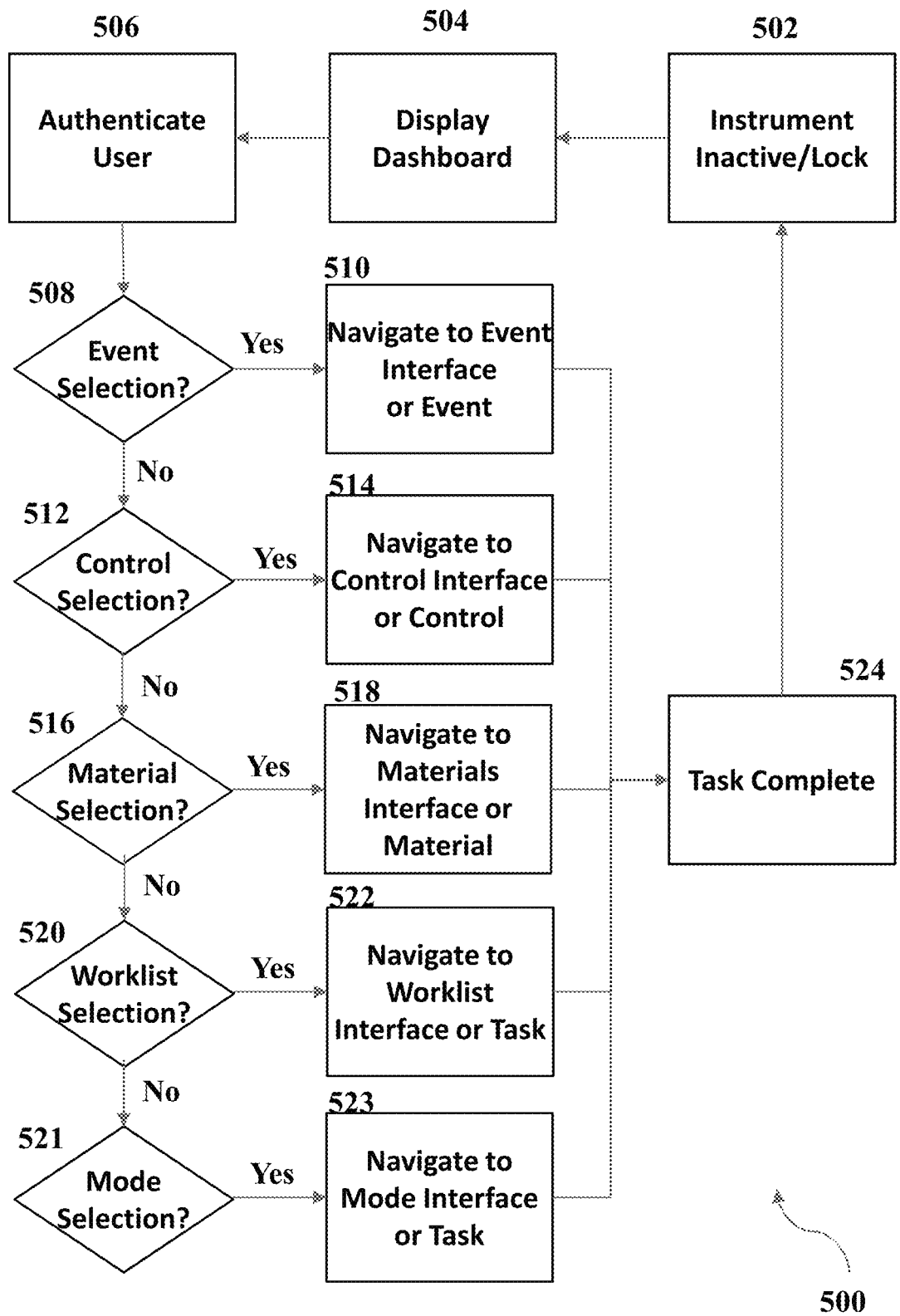
FIG. 7 is an exemplary process that may be used to provide the dashboard interface to a user from an inactive state of the lab instrument.

Turning now to FIG. 7, that figure shows an exemplary process 500 that may be used to provide the dashboard interface 200 to a user from an inactive state of the lab instrument 100. In embodiments performing these steps, the dashboard interface 200 can act as a screensaver displaying on display 102 whenever the lab instrument 100 is locked by the prior user, or is inactive for a period of time, for example. When the instrument is inactive 502, the dashboard interface 200 will be displayed 504. If a user interacts with the dashboard interface 200 (e.g., by touching or selecting from the interface) the lab instrument 100 may first authenticate 506 the user. This may include in varying embodiments using the user authentication device 110 for facial or biometric recognition, receiving a password via the user input device 104, or other variations.

Once authenticated 506, the dashboard interface 200 will navigate the user to a subsequent interface based upon the user selection or input. The subsequent interface may be an interface available through the same software application as the dashboard interface 200, or may be separate (e.g., some inputs may launch a separate browser usable to submit a service request). In this manner, the dashboard interface 200 may be advantageously implemented in a variety of pre-existing lab instrument interfaces and other systems and can serve as an overlay or navigation point to those pre-existing interfaces.

Where the user selection is an event selection 508 from the event status 214, the dashboard interface 200 may navigate 510 the user to a general event interface, or a specific event interface, depending upon the user selection. For example, where the user selects a column header or other non-specific information from the event status 214, a general event interface may be displayed. Where the user selects a particular event, an event interface pre-configured for reviewing and taking action on that event may be displayed. In cases where the dashboard interface 200 is not part of the same software application providing the other interfaces, a particular event, or pre-filled inputs or configurations may be coupled with a request to launch the separate application as metadata.

As with event selection 508, where the user selection is a control selection 512 from the control status 206, the user may be navigated 514 to a general or specialized control interface to review the status and take any needed action. Where the user selection is a material selection 516 from the set of material icons 210, the user may be navigated 518 to a general or specialized materials interface to review the status, perform material resupplying, and take any other needed action. Where the user selection is a worklist selection 520 from the worklist status 216 or task status 218, the user may be navigated 522 to a general or specialized worklist interface to review the status of past, current, and future tasks, and modify or make any desired changes. Where the user selection is a mode selection 521 from the mode status 242, the user may be navigated 523 to a general or specialized mode interface to review and modify control modes. When the user has completed any tasks 524 (e.g., in some instances their only task may be addressing a service alert or issue, while in others they may also be using the lab instrument 100 for testing), the lab instrument 100 may be returned to an inactive 502 state and the dashboard interface 200 may again be displayed 504.

Implementing the dashboard interface 200 as described in FIG. 7 may advantageously provide users an aggregate source of useful information that is visible and apparent without any action on their part. For example, a user selecting a lab instrument to use from amongst several may glance at the dashboard interface 200 for one or more instruments and select one to use based upon whether they are in a hurry, or have time to refill materials. In the case where they choose a lab instrument with some active alerts, such as a material alert, they can navigate immediately to a material interface that is pre-configured for the replaced material (e.g., known information is pre-filled in text inputs, a barcode scanner interface is loaded and prepared for capture).

Figure 8:
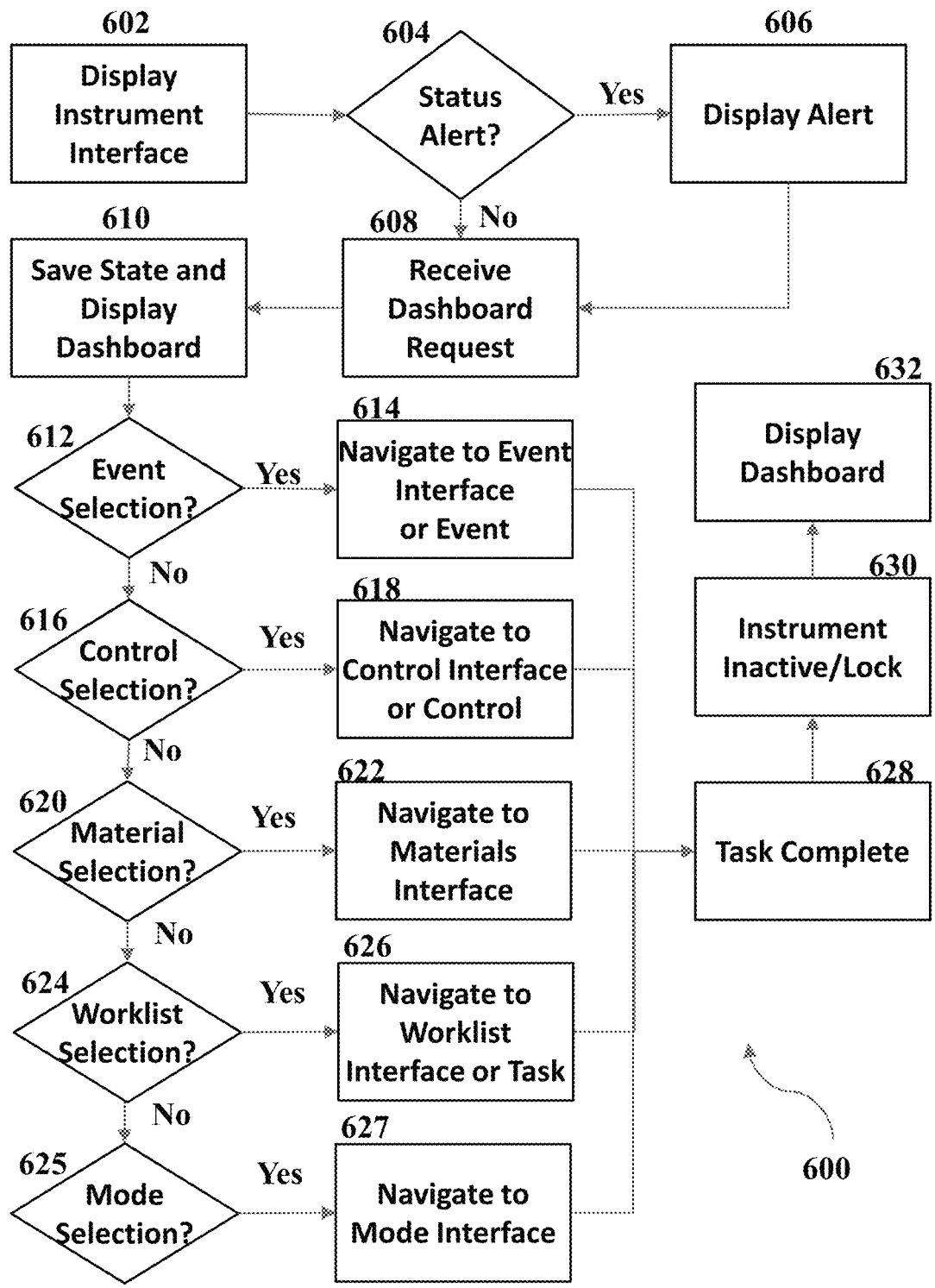
FIG. 8 is an exemplary process that may be used to provide the dashboard interface to a user from an active state of the lab instrument.

FIG. 8 is an exemplary process 600 that may be used to provide the dashboard interface 200 to a user from an active state of the lab instrument 100. This may be useful where, for example, a user is actively using the lab instrument 100 and desires a high-level review of its status that is offered by the dashboard interface 200, rather than viewing five or more separate interfaces to view similar information. The processes of FIGS. 7 and 8 may be implemented individually or in combination, as desired for a particular embodiment. The lab instrument 100 may display 602 its standard interface to a user while in active use. If a status alert occurs 604 (e.g., based upon a change in status such as described in FIG. 6), an alert may be displayed 606 via the standard interface that may be selected by a user to navigate to the dashboard interface 200 from the current interface. In the absence of an alert 604, the standard interface may still provide controls for requesting that the dashboard interface 200 load. When a dashboard request is received 608, the lab instrument 100 may store the state of the prior interface and then display 610 the dashboard to the user.

From the dashboard interface 200, the lab instrument 100 may receive selections for events 612, controls 616, materials 620, worklists 624, and modes 625 as described above in relation to FIG. 7, and may in response navigate the user to the appropriate event interface 614, control interface 618, material interface 622, worklist interface 626, or mode interface 627, as described above in relation to FIG. 7. When the user completes 628 any tasks associated with their request of the dashboard interface 200 (e.g., navigating to a subsequent interface and fixing a status alert 604 that arose during their prior use, completing their review of the worklist and determining there is no issue), the lab instrument 100 may then be locked by a user or may become inactive or locked 630 after a period of time where it is not operated by a user, and may automatically display 632 the dashboard interface 200 as described in relation to FIG. 7. In some embodiments, when the user completes 628 any tasks associated with their request of the dashboard interface 200, the lab instrument 100 may automatically return the user to their origin interface and restore it to its prior state saved before the dashboard interface 200 was displayed 610. This may be advantageous where, for example, a user is configuring a task to be performed on the lab instrument and a status alert 604 arises. The user may navigate to the dashboard interface 200, use the dashboard interface 200 to navigate to subsequent interfaces to address the status alert 604, and then return 630 to their origin interface in substantially the same state that they left it. In this manner the user will not have to re-enter any configuration data, and may also be less likely to forget some details of, or forget to complete entirely, their previous task. In some embodiments, the subsequent interface may have one or more controls such as a "back" button that may be selected to return the user to the dashboard interface 200, the stored prior interface, or another interface as may be desired.

Further variations on, and features for, the inventors' technology will be immediately apparent to, and could be practiced without undue experimentation by, those of ordinary skill in the art in light of this disclosure. Accordingly, instead of limiting the protection accorded by this document, or by any document which is related to this document, to the material explicitly disclosed herein, the protection should be understood to be defined by the claims, if any, set forth herein or in the relevant related document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to such claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions: When appearing in the claims, a statement that something is "based on" something else should be understood to mean that something is determined at least in part by the thing that it is indicated as being "based on." When something is required to be completely determined by a thing, it will be described as being "based exclusively on" the thing.

When used in the claims, "determining" should be understood to refer generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

When used in the claims a "means for aggregating from a plurality of interfaces and displaying, via the display and as a single interface, instrument status information that is traversable to subsequent interfaces, when the lab instrument is locked or not operated by a user" should be understood as a means plus function limitation as provided for in 35 U.S.C. § 112(f), in which the function is "aggregating from a plurality of interfaces and displaying, via the display and as a single interface, instrument status information that is traversable to subsequent interfaces, when the lab instrument is locked or not operated by a user" and the corresponding structure is a computer configured to perform processes as illustrated in FIG. 7 and described in the corresponding text.

The invention claimed is:

1. A method comprising:
   a) storing a stored interface state of a lab instrument;
   b) displaying an interface comprising an aggregate set of status data on a display coupled to the lab instrument;
   c) receiving a user selection of status data from the aggregate set of status data comprised by the interface;
   d) displaying a destination interface that is associated with the user selected status data of the aggregate set of status data on the display; and
   e) returning the lab instrument to the stored interface state after displaying the destination interface.

2. The method of claim 1, wherein the destination interface is a materials interface and the aggregate set of status data comprises a set of materials data describing one or more types of material available for the lab instrument to use, wherein the interface comprises, for each material in the set of materials, a material icon and a material quantity, and wherein the destination interface associated with each material, where the material quantity is below a resupply threshold, is configured to allow a user to resupply the material associated with that material icon.

3. The method of claim 1, wherein the destination interface is a control interface and the aggregate set of status data comprises a set of control data describing one or more control tests performed on the lab instrument, wherein the interface comprises, for each control test, a test date, a test type, and a test result, and wherein the destination interface associated with each control test, where the test result is a failure, is configured to allow a user to re-run the test type associated with the control test.

4. The method of claim 1, wherein the destination interface is a worklist interface and the aggregate set of status data comprises a set of worklist data describing one or more instrument tasks currently being performed by the lab instrument, wherein the interface comprises, for each instrument task, a cassette description and a task stage, and wherein the destination interface associated with each instrument task is configured to allow a user to review and modify the instrument task.

5. The method of claim 1, further comprising:
   a) determining, based upon the aggregate set of status data, one or more status alerts; and
   b) where at least one of the status alerts comprises a service alert indicating that the lab instrument requires a service, displaying a service indicator on the interface, wherein the service indicator is configured to be removable by a technician performing the service.

6. The method of claim 1, further comprising:
   a) displaying a plurality of interfaces, individually, on the display, wherein the destination interface is one of the plurality of interfaces, and wherein the plurality of interfaces comprise status information generated by the lab instrument;
   b) identifying, as a subset of the status information, the aggregate set of status data; and
   c) locking the lab instrument when it is not in use.

7. The method of claim 6, further comprising, before displaying the destination interface, authenticating a user based upon biometric data received via a biometric authenticator of the lab instrument.

8. The method of claim 1, wherein returning the lab instrument to the stored interface state occurs after:
   a) determining that the destination interface should be closed; or
   b) when the interface was displayed in response to a user request while the lab instrument was operated by a user, determining that the interface should be closed.

9. A system comprising:
   a) a lab instrument; and b) one or more computers programmed with computer executable instructions stored on a non-transitory computer readable medium to perform steps comprising:
  i) storing a stored interface state of the lab instrument;
  ii) displaying an interface comprising an aggregate set of status data on a display coupled to the lab instrument;
  iii) receiving a user selection of status data from the aggregate set of status data comprised by the interface;
  iv) displaying a destination interface that is associated with the user selected status data of the aggregate set of status data on the display; and
  v) returning the lab instrument to the stored interface state after displaying the destination interface.

10. The system of claim 9, wherein the destination interface is a materials interface and the aggregate set of status data comprises a set of materials data describing one or more types of material available for the lab instrument to use, wherein the interface comprises, for each material in the set of materials, a material icon and a material quantity, and wherein the destination interface associated with each material, where the material quantity is below a resupply threshold, is configured to allow a user to resupply the material associated with that material icon.

11. The system of claim 9, wherein the destination interface is an event interface and the aggregate set of status data comprises a set of event data describing one or more events that have occurred on the lab instrument, wherein the interface comprises, for each event, an event date and an event type, and wherein the destination interface associated with each event, where the event type indicates an error, is configured to allow a user to review and correct the error.

12. The system of claim 9, wherein the destination interface is a worklist interface and the aggregate set of status data comprises a set of worklist data describing one or more instrument tasks currently being performed by the lab instrument, wherein the interfaces comprise, for each instrument task, a cassette description and a task stage, and wherein the destination interface associated with each instrument task is configured to allow a user to review and modify the instrument task.

13. The system of claim 9, wherein the one or more computers are further programmed to perform steps comprising:
  a) determining, based upon the aggregate set of status data, one or more status alerts; and
  b) where at least one of the status alerts comprises a service alert indicating that the lab instrument requires a service, displaying a service indicator on the interface, wherein the service indicator is configured to be removable by a technician performing the service.

14. The system of claim 9, wherein the one or more computers are further programmed to perform steps comprising:
  a) displaying a plurality of interfaces, individually, on the display, wherein the destination interface is one of the plurality of interfaces, and wherein the plurality of interfaces comprise status information generated by the lab instrument;
  b) identifying, as a subset of the status information, the aggregate set of status data; and
  c) locking the lab instrument when not in use.

15. The system of claim 14, wherein the one or more computers are further programmed to perform steps comprising, before displaying the destination interface, receiving a user authentication and verifying that a user is authorized to access the lab instrument based upon the user authentication.

16. The system of claim 15, wherein the user authentication is a set of biometric data received via a biometric authenticator of the lab instrument.

17. The system of claim 9, wherein the one or more computers are programmed to perform the step of returning the lab instrument to the stored interface state after:
  a) determining that the destination interface should be closed; or
  b) when the interface was displayed in response to a user request while the lab instrument was operated by a user, determining that the interface should be closed.

18. The system of claim 9, wherein:
  a) the one or more computers are programmed to perform the step of displaying the interface comprising the aggregate set of status data on the display coupled to the lab instrument when the lab instrument is locked or not operated by a user;
  b) the one or more computers are programmed to perform the step of storing the stored interface state of the lab instrument before the step of displaying the interface comprising the aggregate set of status data on the display coupled to the lab instrument; and
  c) the step of returning the lab instrument to the stored interface state after displaying the destination interface comprises displaying a previous interface different from the interface comprising the aggregate set of status data, wherein the previous interface corresponds to the stored interface state.

19. The system of claim 9, wherein the one or more computers are programmed to perform the step of returning the lab instrument to the stored interface state automatically after determining that the destination interface should be closed based on completion of a task associated with the destination interface.

* * * * *